(12) United States Patent
Endo

(10) Patent No.: US 7,565,068 B2
(45) Date of Patent: Jul. 21, 2009

(54) IMAGE-TAKING APPARATUS

(75) Inventor: Hiroshi Endo, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 371 days.

(21) Appl. No.: 11/491,290

(22) Filed: Jul. 24, 2006

(65) Prior Publication Data
US 2007/0019937 A1    Jan. 25, 2007

(30) Foreign Application Priority Data
Jul. 22, 2005    (JP)    ............................ 2005-212965

(51) Int. Cl.
*G03B 17/00* (2006.01)
*H04N 5/225* (2006.01)
*G02B 27/64* (2006.01)

(52) U.S. Cl. .................. 396/52; 396/55; 348/208.6; 348/208.12; 359/554

(58) Field of Classification Search ............. 396/52–55; 348/208.99, 208.1, 208.2, 208.3, 208.4, 208.5, 348/208.6, 208.8, 208.11, 208.12, 208.13, 348/208.14, 208.15, 208.16; 359/554
See application file for complete search history.

(56) References Cited

U.S. PATENT DOCUMENTS 6,301,440 B1 * 10/2001 Bolle et al. .................. 396/128
2004/0239771 A1 * 12/2004 Habe ..................... 348/208.12

FOREIGN PATENT DOCUMENTS

| JP | 5-007328 A | 1/1993 |
|---|---|---|
| JP | 7-281239 A | 10/1995 |

* cited by examiner

*Primary Examiner*—Rochelle-Ann J Blackman
(74) *Attorney, Agent, or Firm*—Sughrue Mion, PLLC

(57) ABSTRACT

An image-taking apparatus includes an imaging device and a shooting lens of variable foal length, and generates image signals by forming a subject image entering through the shooting lens on the imaging device. The apparatus includes an angular-velocity sensor that predicts a shake that will occur at shooting by detecting a shake before shooting. The apparatus also includes a main CPU that controls exposure by adopting a shutter speed within a maximum shutter speed. The maximum shutter speed can be changed according to a result of shake detection and a focal length of the shooting lens to be used at shooting.

14 Claims, 13 Drawing Sheets

IMAGE-TAKING APPARATUS

BACKGROUND OF THE INVENTION

1. Field of the Invention

The present invention relates to an image-taking apparatus that includes an imaging device and forms a subject image on the imaging device thereby generating image signals.

2. Description of the Related Art

Image-taking apparatus so-called digital cameras have an imaging device such as charge-coupled device (CCD) type or metal-oxide semiconductor (MOS) type and captures subject light entering through a shooting lens with the imaging device to generate image signals. Such digital cameras have become rapidly widespread in recent years. Similarly to cameras that perform shooting by use of photographic films, digital cameras enable a user to select a condition for exposure, which is a combination of shutter speed and aperture suitable for subject brightness or user's preference. Moreover, digital cameras can be made smaller in size and lighter in weight as compared to conventional cameras using photographic films.

Since digital cameras have become smaller and lighter, how to deal with camera shakes has come into focus as one of serious problems because a light and small digital camera is prone to move at the time of shooting thereby causing camera shakes.

In order to address problems related to camera shakes, various attempts have been proposed (see Japanese Patent Application Publications No. 7-281239 and No. 5-7328 for example).

Japanese Patent Application Publication No. 7-281239 proposes a technique for reducing blurriness of a subject image. In this technique, a blur correction device is employed and a maximum shutter speed (per sec.) is set beforehand in view of the limit of performance of the blur correction device that is driven while slow-sync shooting is performed. To reduce blurriness of a subject image, a shutter speed to be used at the slow-sync shooting is made shorter than the maximum shutter speed. Meanwhile, Japanese Patent Application Publication No. 5-7328 proposes a technique for reducing blurriness of a subject image for movie shooting by detecting movements of the subject image.

However, the technique of Japanese Patent Application Publication No. 7-281239 has such a drawback that, because the maximum shutter speed to be used when the blur correction device is driven is determined by the limit of performance of the blur correction device, a range of selectable conditions for exposure is limited by the driving of the blur correction device. Also, the technique of Japanese Patent Application Publication No. 5-7328 has such a drawback that blurriness of a subject image in one field corresponding to a still image cannot be corrected because this technique is configured to correct a blur generated between fields in a moving image.

The present invention has been made in view of the above circumstances, and provides an image-taking apparatus capable of reducing blurriness of a subject image while providing a wide range of conditions used to determine exposure.

SUMMARY OF THE INVENTION

A first image-taking apparatus according to the invention includes an imaging device and a shooting lens of variable foal length and generates image signals by forming a subject image entering through the shooting lens on the imaging device, the image-taking apparatus comprising:

a shake detection section that predicts a shake that will occur at shooting by detecting a shake before shooting; and an exposure control section that controls exposure by adopting a shutter speed within a maximum shutter speed that is changeable according to a result of shake detection by the shake detection section and a focal length of the shooting lens to be used at shooting.

In the first image-taking apparatus, because the maximum shutter speed is changeable according to the result of shake detection and the focal length, it is possible to determine an exposure by selecting a condition for exposure from a wider range as compared to conventional apparatus in which the maximum shutter speed is lowered according to the limit of performance. For example, in a situation where shooting is performed by an inexperienced user, resulting in a large shake, the first image-taking apparatus can select a shorter shutter speed by reducing the maximum shutter speed. In contrast, in a situation where shooting is performed by an experienced user, resulting in only a faint shake, the first image-taking apparatus can select a long shutter speed and combine a large aperture value providing a deeper depth of field with the selected shutter speed so that shooting can be performed for a wide range brought into focus.

In the first image-taking apparatus according to the invention, preferably, the exposure control section increases sensitivity for shooting when underexposure is likely, even if a maximum shutter speed according to a result of shake detection by the shake detection section and a focal length of the shooting lens to be used at shooting is combined with any settable aperture value.

The lower the sensitivity for shooting, the smaller influence of noise is exerted on image signals. In this apparatus, a high sensitivity level is selected only when underexposure is expected to result even if a shutter speed is equal to the maximum shutter speed. Therefore, it is possible to perform shooting accompanied by a small noise by maintaining the lowest sensitivity level while reducing the influence of shake.

A second image-taking apparatus according to the invention includes an imaging device and generates image signals by forming a subject image on the imaging device, comprising:

a blur detection section that predicts a blur in a subject image that will occur at shooting by detecting a movement of a subject image before shooting; and an exposure control section that controls exposure by adopting a shutter speed within a maximum shutter speed that is changeable according to a result of movement detection by the blur detection section.

The second image-taking apparatus can set a range of selectable conditions for exposure, suitable for a blur in a subject image, without using a shake detector such an angular-velocity sensor. Blurs in a subject image include those caused by shakes, i.e. positional changes of the image-taking apparatus, and those caused by movements of a subject. The second image-taking apparatus of the invention can set a range of selectable conditions for exposure, suitable for a blur in a subject image caused by a movement of the subject.

In the second image-taking apparatus, preferably, the blur detection section detects a movement of a subject image in any area selected from a plurality of areas within a shooting angle of view.

By selecting an area that usually receives more attention from among areas within a shooting angle of view and detecting a blur of a subject image in the selected area, it is possible to adopt a condition for exposure suitable for the blur in this area.

The second image-taking apparatus may further include a face recognition section that recognizes a face position of a person within the shooting angle of view, wherein the blur detection section detects a movement of a subject image in the face position recognized by the face recognition section.

A face position to be recognized by the face-recognition section usually receives attention most. Therefore, by detecting a blur of a subject image in an area including a face position, it is possible to adopt a condition for exposure suitable for the blur in this area.

As described above, the invention realizes image-taking apparatus capable of determining an exposure by selecting a shutter speed from a wide range of options while reducing blurriness of a subject image.

DETAILED DESCRIPTION OF THE INVENTION

Embodiments of the present invention will be described with reference to the drawings.

Figure 1:
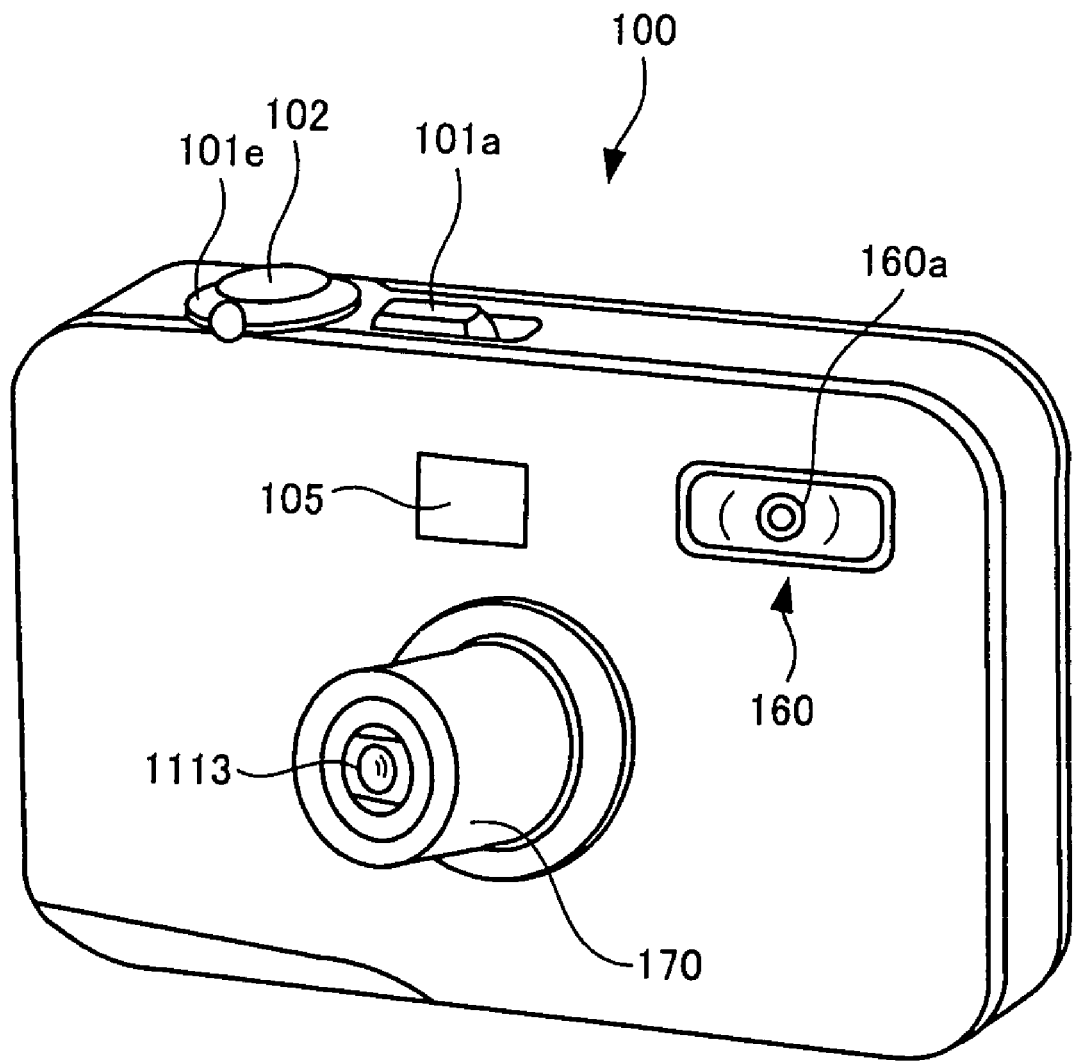
FIG. 1 is a diagram showing a digital camera according to a first embodiment of the invention.
Figure 2:
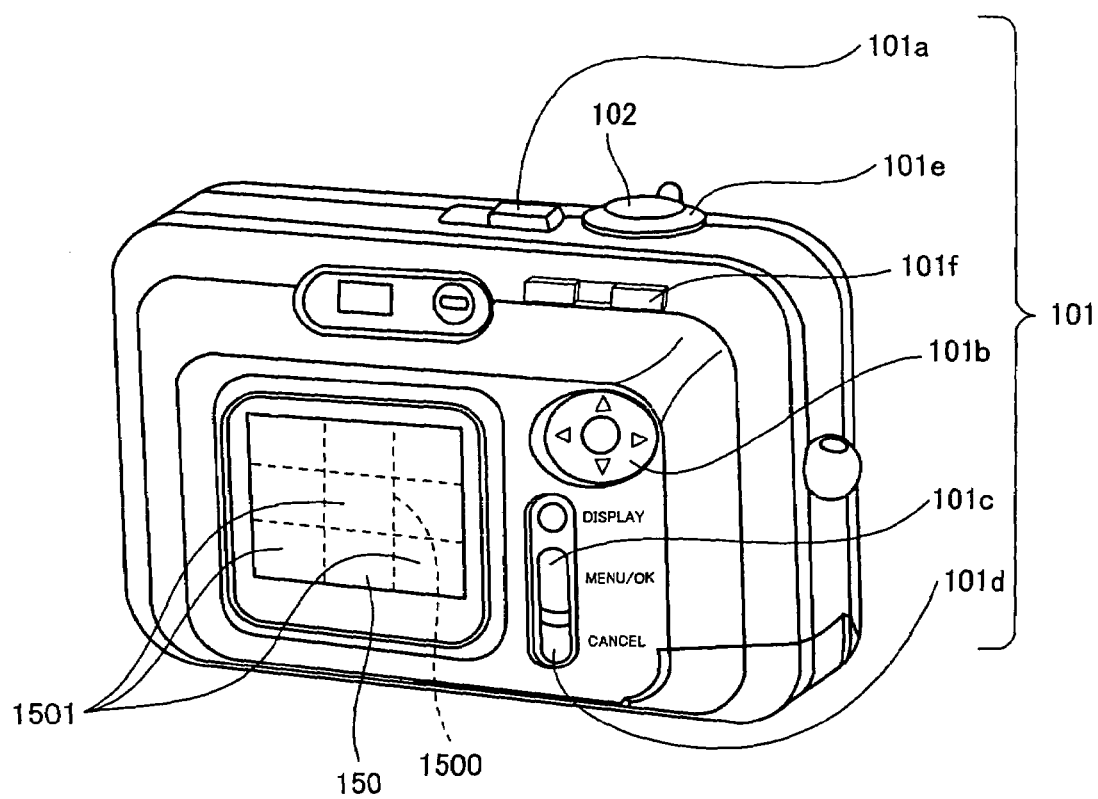
FIG. 2 is another diagram showing the digital camera according to the first embodiment of the invention.

FIGS. 1 and 2 show a digital camera 100 according to a first embodiment of the invention. FIGS. 1 and 2 show the front and back of the digital camera 100, as viewed obliquely from above, respectively.

As shown in FIG. 1, the digital camera 100 is provided with a lens barrel 170 having a shooting lens group 1113. An image of a subject is led through the image-taking optical system to a charge coupled device (CCD) disposed inside the digital camera 100. As will be described later, the digital camera 100 is configured such that the CCD generates image signals representing a through image (live view) and a taken image and a main CPU performs a through-the-lens (TTL) distance measurement and TTL metering based on the image signals in order to detect subject distance and subject brightness.

The TTL distance measurement is performed to each of distance-measurement areas into which a shooting angle of view is two-dimensionally divided. The TTL metering is also performed to each of metering areas into which a shooting angle of view is two-dimensionally divided.

The focal length of the shooting lens group 1113 disposed in the lens barrel 170 is variable and therefore, a shooting angle of view can be adjusted according to an operation.

As shown in FIG. 1, a finder 105 and an emission section 160 are disposed above the lens barrel 170 of the digital camera 100. The emission section 160 has a LED 160a and irradiates a subject with fill-light for shooting emitted from the LED 160a.

As shown in FIG. 2, disposed on the back and top of the digital camera 100 is an operating switch group 101 for allowing a user to perform various operations therethrough when using the digital camera 100.

The operating switch group 101 includes a power switch 101a, a release button 102, a cross key 101b, a MENU/OK key 101c, a cancel key 101d, a mode lever 101e, a zoom key 101f and the like. The mode lever 101e is used to switch between a playback mode and a shooting mode and to switch between a moving-image mode and a still-image mode in the shooting mode. When the shooting mode is selected by the mode lever 101e, a through image (live view) is displayed and a user can take an image by pressing the release button 102 while looking at the through image. When the playback mode is selected by the mode lever 101e, a taken image is displayed on a LCD panel 150. The zoom key 101f is used to adjust the focal length of the shooting lens group 1113 (hereinafter sometimes referred to as "shooting lens 1113") built in the lens barrel 170.

In this digital camera 100, the shooting mode includes various AF modes such as a selected-area AF mode and an auto-area AF mode. When the selected-area AF mode is selected by operating the menu/OK key 101c while the shooting mode is selected, auxiliary dividing lines 1500 dividing a shooting angle of view into multiple areas 1501 are displayed on the LCD panel 150 as shown in FIG. 2 together with a through image. In this condition, when the user selects any area among the divided areas 1501 by operating the cross key 101b, the selected area is set as a distance-measurement area, that is an AF area, where distance measurement is to be performed.

The release button 102 has two operation stages: half-press and full-press. Upon half-press of the release button 102, both of TTL metering and TTL distance measurement are performed, a diaphragm with an aperture corresponding to a photometric value is set at the optical axis, and a focus lens is arranged at a position based on the result of distance measurement within a focus area. Subsequently, upon full-press of the release button 102, an electronic shutter is set for the imaging device, and exposure is performed for shooting. If it is determined that emission of fill-light is necessary at the time of half-press, fill-light is emitted toward irradiation areas from the emission section 160 at the time of full press.

Figure 3:
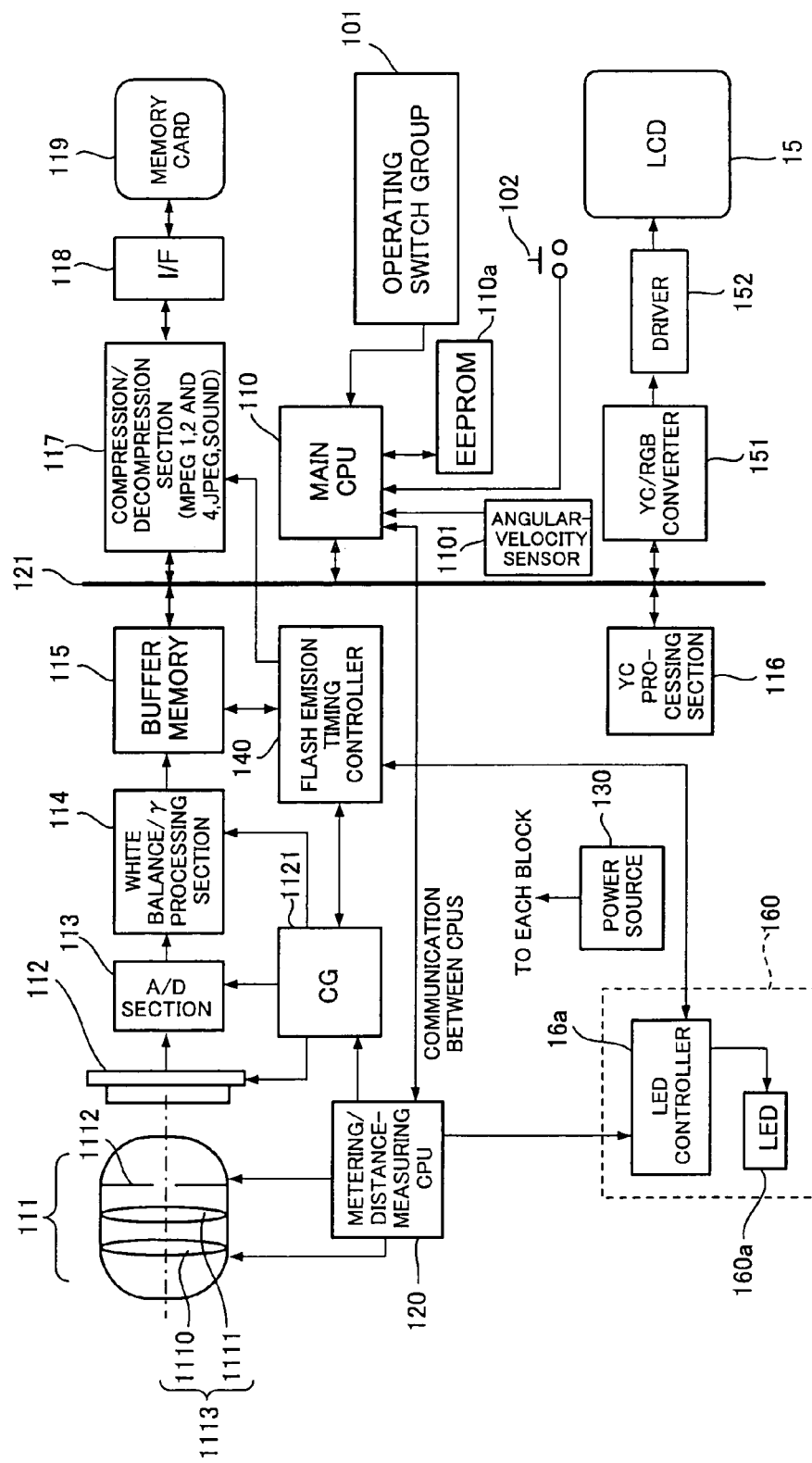
FIG. 3 is a block diagram of the digital camera shown in FIG. 1.

FIG. 3 is a block diagram illustrating the internal configuration of the digital camera 100 shown in FIGS. 1 and 2.

The internal configuration of the digital camera 100 will be described with reference to FIG. 3.

Figure 4:
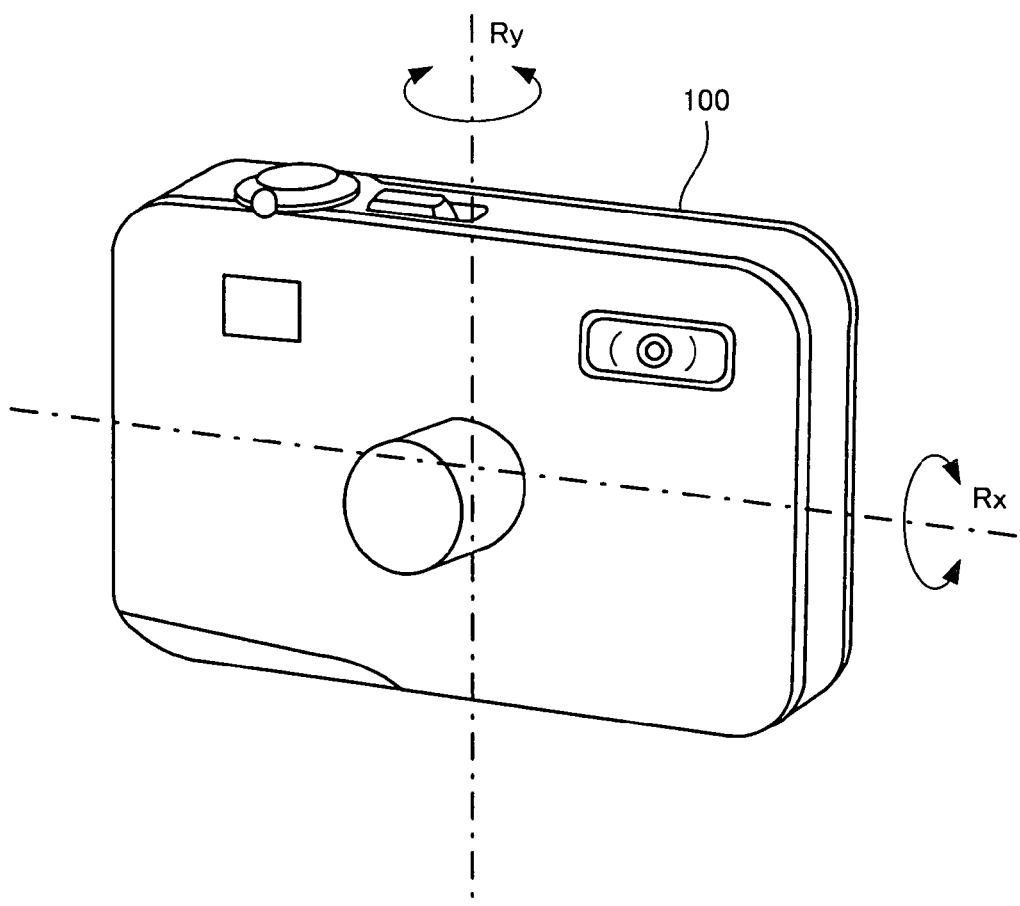
FIG. 4 is a diagram useful for understanding a shake of the digital camera shown in FIG. 1.

The digital camera 100 of the first embodiment includes a main CPU 110 that controls all processing in the digital camera 100. The main CPU 110 receives, at its input section, operation signals from the operating switch group 101. The digital camera 100 includes an angular-velocity sensor 1101 for detecting shake of the digital camera 100. The angular-velocity sensor 1101 detects shake of the digital camera 100 as a turning angular velocity of turns Rx and Ry (see FIG. 4) and supplies the detection result to the input section of the main CPU 110 as shake information. It is assumed here that a shake detected by the angular-velocity sensor 1101 remains at the time of shooting. Therefore, a shake that will occur at the time of shooting can be predicted based on shake information supplied to the main CPU 110.

The main CPU 110 also includes an EEPROM 110a that stores a program necessary for the operation of the digital camera 100. When the power switch 101a (see FIGS. 1 and 2) of the digital camera 100 having such a configuration is turned on, the main CPU 110 starts controlling all the operation of the digital camera 100 according to procedures described in the program stored in the EEPROM 110a.

Now, the flow of image signals will be described with reference to FIG. 3.

When the power switch 101a (see FIG. 1) is turned on, the main CPU 110 detects turning on of the power switch 101a and a power source 130 supplies power to blocks such as the main CPU 110, a metering/distance-measuring CPU 120 and the like. If the shooting mode is selected by the mode lever 101e (see FIG. 1) at the time of turning on the power switch 101a, image signals representing a subject image formed on a CCD 112 are thinned out and output at predetermined intervals so that the subject image represented by the output image signals is displayed on the LCD panel 150 on an LCD 15. The CCD 112 receives timing signals from a clock generator (CG) 1121. Image signals are thinned out and output at predetermined intervals according to the timing signals. The CG 1121 outputs timing signals under instructions from the main CPU 110. Such timing signals are also sent to, in addition to the CCD 112, an A/D section 113 and a white-balance (WB) adjustment γ processing section 114 which are provided in subsequent stages. Accordingly, in synchronization with the timing signals, image signals are sequentially processed in the CCD 112, the A/D section 113 and the WB adjustment γ processing section 114 in the correct order.

After being processed by the A/D section 113 and the WB adjustment γ processing section 114 at predetermined intervals in synchronization with the timing signals from the CG 1121 under instructions from the main CPU 110, the processed image signals are sent to a YC processing section 116 via a bus 121. While the image signals are thus sent via the bus 121, a delay may occur between the processing at the WB adjustment γ processing section 114 and the processing at the YC processing section 116. Therefore, subsequent to the WB adjustment γ processing section 114, a buffer memory 115 is provided to adjust timing for transferring image signals to the YC processing section 116. From the buffer memory 115, image signals stored earlier are transferred first to the YC processing section 116 where the image signals are converted into YC signals through RGB-YC signal conversion. The YC signals are then sent via the bus 121 to a YC/RGB converter 151 where the received YC signals are again converted into RGB signals that are then sent to the LCD 15 via a driver 152. Based on the received RGB signals, the LCD 15 displays an image of a subject on the LCD panel 150. In synchronization with timing signals output from the CG 1121, the CCD 112 keeps generating image signals and the A/D section 113 and the WB adjustment γ processing section 114 keep processing the generated image signals. Therefore, an image of a subject, to which the shooting lens is directed, is continuously displayed on the LCD panel 150. When a user presses the release button 102 while looking at a continuously displayed subject image, after a lapse of predetermined time from the press of the release button 102, all the image signals of a subject image formed on the CCD 112 are output as RGB signals. These RGB signals are converted into YC signals in the YC processing section 116 and the YC signals are then compressed by a compression/decompression section 117. Subsequently, the compressed signals are recorded in a memory card 119 via an interface (I/F) 118. In the compression/decompression section 117, signals representing a still image are compressed by a compression method in conformity with JPEG standards and stored in the memory card 119 as a file. The file stored in the memory card 119 has a header in which compression information, shooting information, etc. are written. When the playback mode is selected by the mode lever 101e of the digital camera 100, the header of the file is read out from the memory card 119 first. Then, based on the compression information in the header read out, the compressed image signals in the file are decompressed so that the original image signals are restored. Subsequently, a subject image based on the restored original image signals is displayed on the LCD panel 150.

The digital camera 100 of the present embodiment is provided with the metering/distance-measuring CPU 120 for adjusting focus and exposure in addition to the main CPU 110. The metering/distance-measuring CPU 120 controls positions of a focus lens 1110 and a zoom lens 1111 and aperture change in an image-taking optical system 111.

To adjust the focus by controlling the position of the focus lens 1110, if, for example, a center-fixed AF mode among the AF modes is selected, an area for the center point is selected as an AF area (distance-measurement area) where distance measurement is to be performed, and the focus lens 1110 of the shooting lens group 1113 is driven based on the result of the distance measurement performed in the selected AF area. When the auto-area AF mode is selected, subject contrast is detected for each of the areas defined by the auxiliary dividing lines 1500 shown in FIG. 2, and an area with the highest subject contrast is regarded as an AF area (distance-measurement area) where distance measurement is to be performed. The focus lens is driven to move to a position corresponding to the result of the distance measurement performed in the selected AF area. When the selected-area AF mode is selected, distance measurement is performed in an AF area selected according to user operation, and the focus lens 1110 of the shooting lens group 1113 is driven to move to a position corresponding to the result of the distance measurement performed in the selected AF area.

In focal length adjustment, upon detecting the zoom key 101f being operated, the main CPU 110 provides an instruction to change the focal length to the light measurement/distance measurement CPU 120. According to the received instruction, the light measurement/distance measurement CPU 120 changes the focal length by driving the zoom lens 1111 of the shooting lens group 1113.

In exposure adjustment, the results of metering performed in the AF area and the other areas are sent from the main CPU 110 to the metering/distance-measuring CPU 120, and the metering/distance-measuring CPU 120 determines, for example, an average brightness level. Based on the determined brightness level, the aperture size of a diaphragm 1112 is controlled so that an amount of light to be given to the imaging surface of the CCD 112 is adjusted. Also, the main CPU 110 determines, in addition to an aperture value, a shutter speed (sec) to be used at shooting and a shooting sensitivity level representing the sensitivity of the CCD 112. The gain of an amplifier for amplifying image signals read out from the CCD 112 is so controlled as to adjust the shooting sensitivity. A combination of an aperture value, shutter speed and sensitivity level, which compose a condition for exposure at shooting, is determined based on both a shake detected by the angular-velocity sensor 1101 and a focal length of the shooting lens group 1113 to be used at shooting.

Furthermore, in the digital camera 100 of this embodiment, in response to an instruction from the main CPU 110, the metering/distance-measuring CPU 120 controls light emission from the emission section 160 by controlling an LED controller 16a. The digital camera 100 also includes a flash (fill-light) emission timing controller 140 that synchronizes emission timing with image-frame processing timing.

Now, there will be described exposure control performed in the digital camera 100.

Figure 5:
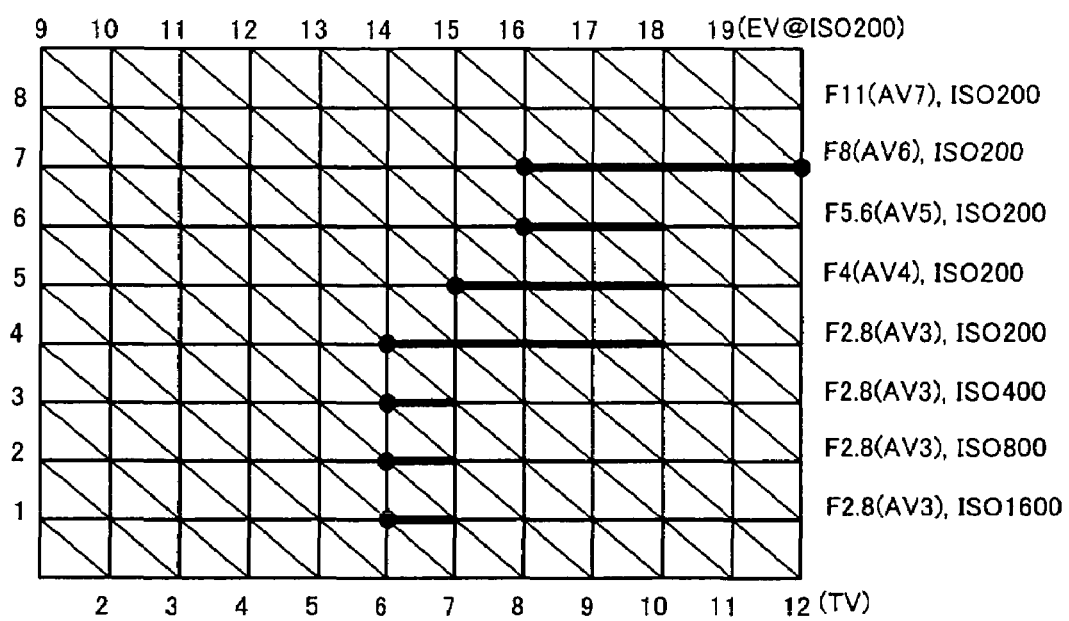
FIG. 5 is a program chart showing an example of exposure control performed in the digital camera shown in FIG. 1.

FIG. 5 is a program chart showing an example of exposure control performed in the digital camera 100. The program chart shows a range of combinations of aperture value, shutter speed and sensitivity level, which can be used by the main CPU 110 of the digital camera 100 on condition that a detected shake is below a predetermined level and the focal length is set at the wide-angle side. In the digital camera 100 of the first embodiment, a maximum shutter speed for limiting a range of selectable shutter speeds is set up such that a blur of a subject image at the maximum shutter speed (sec) falls within a predetermined acceptable blur circle. Therefore, the maximum shutter speed can be changed according to both results of shake detection and a focal length.

For example, in the program chart shown in FIG. 5, the maximum shutter speed is set at "TV6" and shutter speeds within TV6 can be used. For example, for subject brightness "EV11," either the combination of "TV7" and "F4" or the combination of "TV8" and "F2.8" can be selected as a combination of shutter speed and aperture value. If the combination including a higher aperture value "F4" is selected between these selectable combinations, it is possible to perform shooting with focusing obtained in a wide range, because the selected combination has a deeper depth of field.

Here, for example, when the digital camera 100 is unstably held and an inexperienced user performs shooting, it is very likely that a shake above the predetermined level is detected and thus a blur of a subject image at the shutter speed TV6 does not fall within the acceptable blur circle. In this case, a shorter value, for example, TV8, is set as the maximum shutter speed and a shutter speed is selected from shutter speeds within TV8. Specifically, the shutter speed "TV7" cannot be used for the brightness level "EV11" and therefore, only the combination of "TV8" and "F2.8" can be selected.

When the focal length of the shooting lens is set at the telephoto side, a blur of a subject image is enlarged even if a shake is small. In this case, a blur of a subject image at the maximum shutter speed will not fall within the acceptable blur circle. Accordingly, similarly to the case where a shake above the predetermined level is detected, a shorter value, e.g. TV8, is set as the maximum shutter speed, and a shutter speed is selected from a range within "TV8". Specifically, the shutter speed "TV7" cannot be used for the brightness level "EV11" and therefore, only the combination of "TV8" and "F2.8" can be selected.

When the focal length of the shooting lens is set at the telephoto side, if a shake above the predetermined level is detected, a blur of a subject image even at the shutter speed TV8 will not fall within the acceptable blur circle. In this case, a further shorter value, e.g. TV9, is set as the maximum shutter speed, and a shutter speed is selected from a range within "TV9". Specifically, neither of the shutter speed "TV7" nor "TV8" can be used for the brightness level "EV11" and therefore, only the shutter speed "TV9" can be used. However, at ISO200, even if any settable aperture value is combined with "TV9" serving as the maximum shutter speed, underexposure will result. In this case, sensitivity is increased to a higher level, e.g. ISO400, so that correct exposure can be obtained with the combination of the shutter speed "TV9" and the aperture value "F2.8."

Now, there will be described the main processing performed by the main CPU 110, which is described in the program stored in the EEPROM 110a. Subsequently, there will be described the details of exposure processing in the main processing.

The main processing will be described with reference to FIG. 6.

Figure 6:
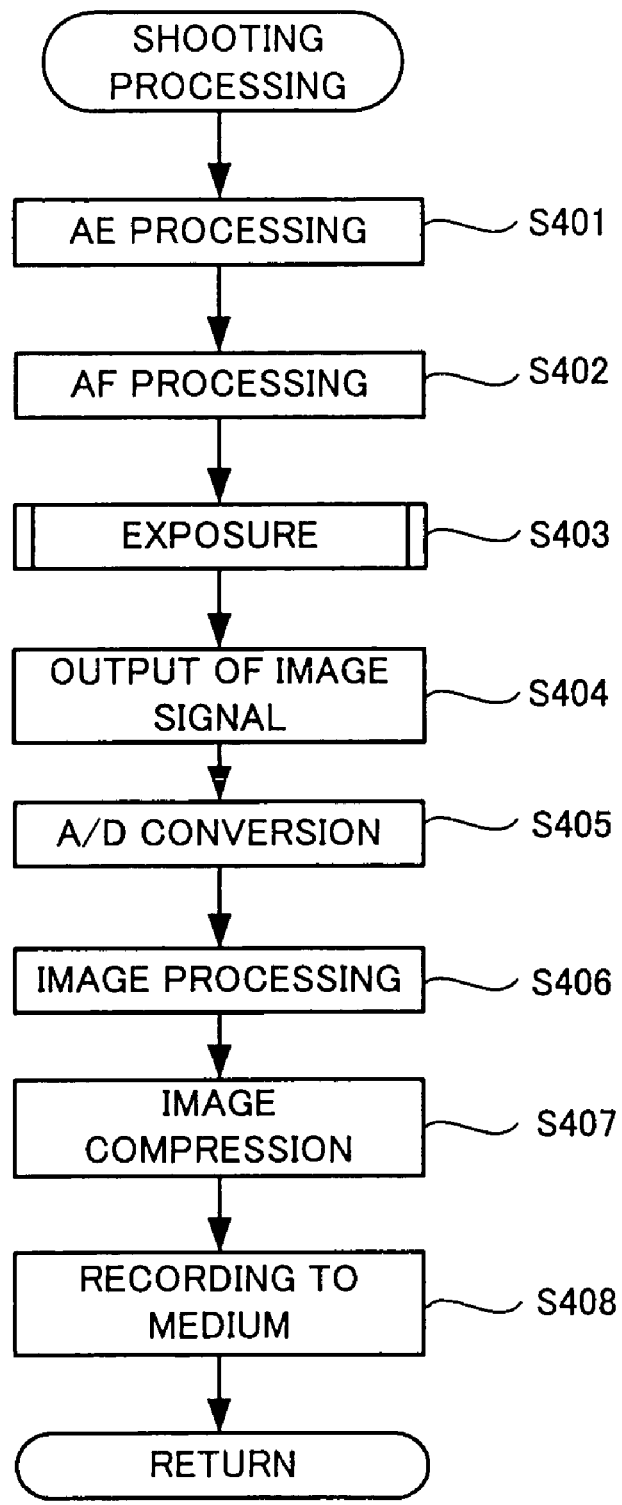
FIG. 6 is a flowchart showing the main processing performed by a main CPU.

FIG. 6 is a flowchart showing the main processing performed by the main CPU 110 for shooting an image by emitting fill-light to a subject.

In response to a half press of the release button 102, the main CPU 110 performs AE processing, i.e. TTL metering, at step S401 and determines an aperture value and a shutter speed (sec) based on the results of the TTL metering. At this step, assuming that there is no camera shake and the focal length of the shooting lens 1113 is set at the wide-angle side, the main CPU 110 sets the minimum sensitivity level ISO200 on which the least influence of noise will be exerted and also sets TV6 as the maximum shutter speed. Here, an aperture value and a shutter speed are selected from a range shown in the program chart shown in FIG. 5. For example, as a condition used to determine exposure for subject brightness "EV11," the combination of shutter speed "TV7" and aperture value "F4" is selected. Based on the selected aperture value, the main CPU 110 causes the metering/distance-measuring CPU 120 to adjust the aperture of the diaphragm 1112. When a fill-light emission for shooting is necessary, the main CPU 110 determines an emission time during which fill-light is emitted.

Subsequently, the main CPU 110 performs AF processing at step S402. The digital camera 100 of the first embodiment has various AF modes such as the center-fixed AF mode, selected-area AF mode and auto-area AF mode. Therefore, it is possible to detect an optimum focus for each area by sampling brightness levels to obtain a subject contrast per area and a focus can be detected only for a selected area or a central area in the AF processing at step S402.

In the AF processing, even if any of the AF modes is selected, the main CPU 110 causes the metering/distance-measuring CPU 120 to move the focus lens 1110 so as to detect a focus by sampling subject contrasts for a predetermined distance-measurement area while the focus lens 1110 is moving, thereby measuring a subject distance. The main CPU 110 then transmits AF information including the measured subject distance to the metering/distance-measuring CPU 120, so that the metering/distance-measuring CPU 120 can move the focus lens 1110 to the focus position based on the AF information. Subsequently, at step S403, upon detection of a full press of the release button 102, the main CPU 110 transmits the detected timing to the metering/distance-measuring CPU 120 so that the metering/distance-measuring CPU 120 causes the CG 1121 to supply an exposure-starting signal to the CCD 112, allowing the CCD 112 to start exposure. If it is necessary to emit fill-light, the main CPU 110 causes the emission section 160 to emit fill-light. After a lapse of time based on the shutter speed (sec), the main CPU 110 closes the electronic shutter by causing the CG 1121 to supply an exposure-ending signal to the CCD 112. Subsequently, the main CPU 110 causes the CCD 112 to output image signals to the A/D section 113 at step S404. Subsequently at step S405, the main CPU 110 causes the A/D section 113 to convert analog image signals into digital image signals that are then sent to the WB adjustment γ processing section 114. At step S406, the main CPU 110 causes the WB adjustment γ processing section 114 to subject the image signals to image processing and the image signals after the image processing are then output to the buffer memory 115. The image signals received by the buffer memory 115 are then supplied to the YC processing section 116 at appropriate timing where the image signals are subjected to image processing. Subsequently at step S407, the main CPU 110 causes the compression/decompression section 117 to compress the image signals and causes the I/F 118 to record the compressed signals into the memory card 119 at step S408 and the flow ends.

The digital camera 100 of the present embodiment controls exposure by selecting a shutter speed within the maximum shutter speed that can be changed according to the result of shake detection and the focal length of the shooting lens 1113. In this connection, the exposure processing at step S403 will be described below more in detail.

Figure 7:
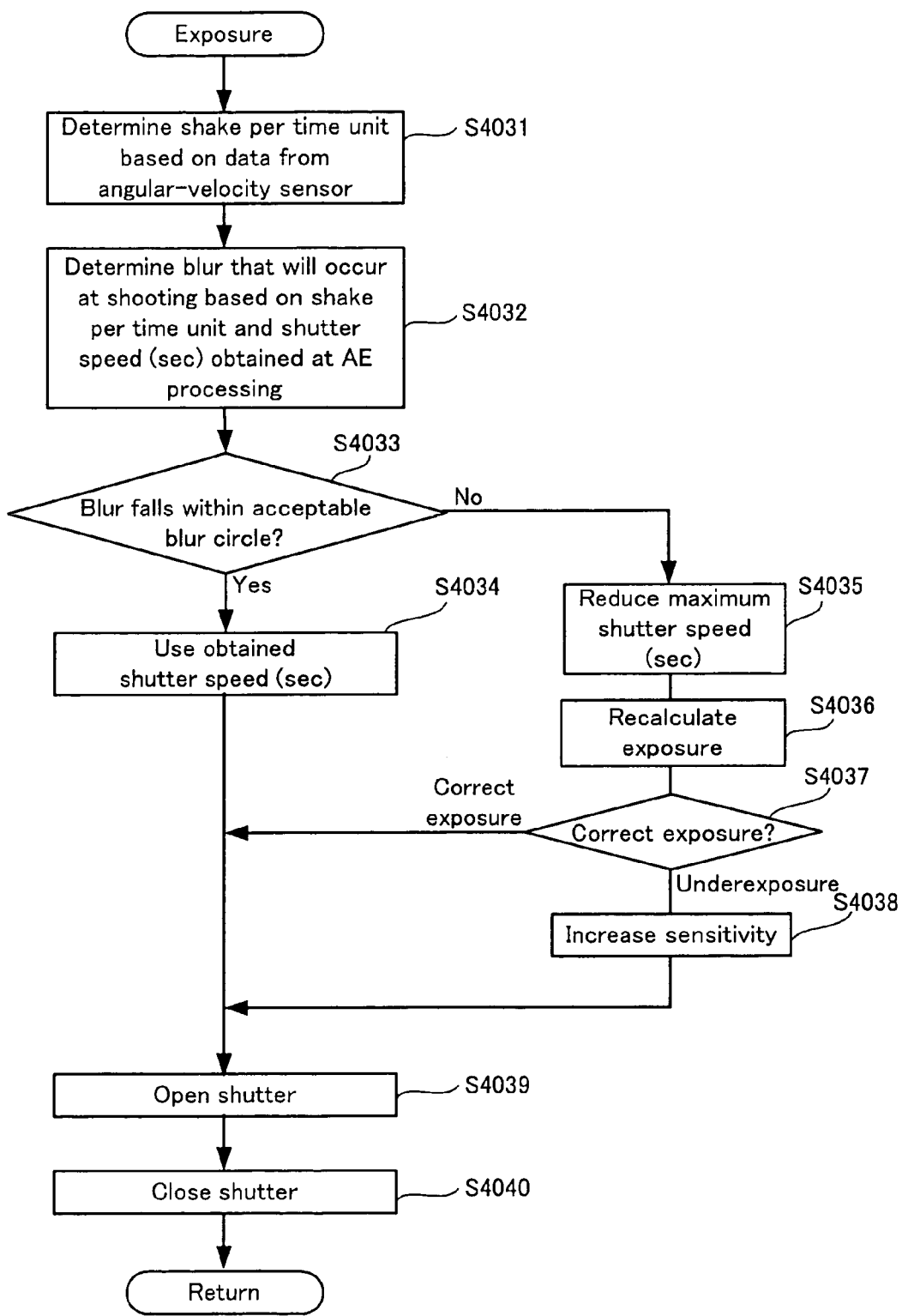
FIG. 7 is a flowchart showing the details of exposure processing.

FIG. 7 is a flowchart showing the details of the exposure processing at step S403 shown in FIG. 6.

At step S4031, the main CPU 110 determines a shake per time unit based on the shake information provided from the angular-velocity sensor 1101 and the focal length. Subsequently at step S4032, the main CPU 110 determines a blur of a subject image that will occur at shooting performed at the selected shutter speed, based on the determined shake per time unit, the shutter speed time selected in the AE processing at step S401 and the focal length.

Subsequently, at step S4033, it is determined whether the determined blur falls within a predetermined acceptable blur circle. If it is determined that the blur falls within the acceptable blur circle, i.e. the blur, which is expected to occur at shooting at the shutter speed that is obtained in the AE processing at step S401, is acceptable, the flow proceeds to step S4034. At step S4034, use of the combination of the shutter speed, e.g. TV7, and the aperture F4 is determined, the flow proceeds to step S4039. In this case, it is determined that a combination of a relatively longer shutter speed and a relatively higher aperture value is to be used and therefore, it is possible to perform shooting with focusing obtained in a wide range as compared to other combinations.

If it is determined that the blur is out of the acceptable blur circle, i.e. the blur, which is expected to occur at shooting at the shutter speed that is obtained in the AE processing at step S401, is not acceptable, the flow proceeds to step S4035. At step S4035, the maximum shutter speed is set at a shorter value, for example, from TV6 to TV8, so that a blur of a subject image at this maximum shutter speed falls within the acceptable blur circle. Subsequently, calculation for exposure (determination of shutter speed and aperture value) is performed again at step S4036 based on the newly set maximum shutter speed. For example, the aperture value F2.8 is combined with the shutter speed TV8 for the subject brightness EV11. Subsequently, at step S4037, it is determined whether correct exposure can be obtained based on the determined shutter speed and aperture value. If it is determined that correct exposure can be obtained, i.e. correct exposure can be obtained based on a shutter speed within the newly set maximum shutter speed suitable for the result of shake detection and the focal length, use of the shutter speed and aperture value, e.g. TV8 and F2.8, obtained at step S4036 is determined and the flow proceeds to step S4039. If it is determined that correct exposure cannot be obtained at step S4038, that is, underexposure will result even if any aperture value is combined with the newly set maximum shutter speed, the flow proceeds to step S4038. At step S4038, sensitivity is increased to a higher level to obtain correct exposure. For example, if the sensitivity level is changed from ISO200 to ISO400 for the subject brightness of EV11, correct exposure can be obtained with the combination of TV9 and F2.8. Then, the flow proceeds to step S4039.

At step S4039, the main CPU 110 sends the determined shutter speed, aperture value and sensitivity level to the metering/distance-measuring CPU 120, and thereby causing, via the metering/distance-measuring CPU 120, the CG 1121 to supply an exposure-starting signal to the CCD 112 so that the electronic shutter is opened. Subsequently at step S4040, the CPU 110 closes the electronic shutter after a lapse of time based on the shutter speed and the flow ends. If fill-light is necessary, the main CPU 110 causes the emission section 160 to emit light and to stop emitting the light at steps S4039 and S4040, respectively.

As described above, in the digital camera 100 of the first embodiment, the maximum shutter speed can be changed according to a result of shake detection and a focal length. Therefore, it is possible to reduce blurriness of subject image by setting a shorter maximum shutter speed in the processing at step S4035, so that a shorter shutter speed can be used in such a situation that a large camera shake is very likely to occur, for example, when shooting is performed by an inexperienced user. Meanwhile, in such a situation that a shake is unlikely to occur, for example, when shooting is performed by an experienced user, a longer shutter speed can be selected and a large aperture value providing a deeper depth of field can be combined with the selected shutter speed. In this case, focusing can be obtained in a wide range for shooting, i.e. a shutter speed can be selected from a wider range of selectable options.

In addition, because the digital camera 100 of the invention is configured to use a high sensitivity level only when underexposure is expected to result even if a shutter speed is equal to the maximum shutter speed, it is possible to perform shooting with a small noise by use of the minimum sensitivity level while reducing the influence of camera shake. However, the invention is not limited to this configuration. For example, when the influence of noise is expected to be small even if the sensitivity is increased, the sensitivity may be raised to a higher level even when correct exposure can be obtained by combining the maximum shutter speed with a selectable aperture value.

When the processing at step S4031 in FIG. 7 is executed by the main CPU 110 shown in FIG. 3, the combination of this processing and hardware such as the main CPU 110 and the angular-velocity sensor 1101 corresponds to an example of the shake detection section according to the invention.

Also, when the processing at step S4032 through S4040 in FIG. 7 is executed by the main CPU 110 shown in FIG. 3, the combination of this processing and hardware such as the main CPU 110 and metering/distance-measuring CPU 120 corresponds to an example of the exposure control section according to the invention.

Although the processing at step S4032 through S4040 in FIG. 7 has been described as an example of processing by the exposure control section according to the invention, the invention is not limited thereto. For example, of the processing at step S4032 through S4040, the processing up to the determination of a shutter speed may be performed in the AE processing at step S401 shown in FIG. 6.

Further, although it has been described that the main CPU 110 performs determination of a shutter speed or a sensitivity level in the present embodiment, the invention is not limited thereto. For example, there may be stored beforehand information about two or more program charts providing different maximum shutter speeds according to camera shake and focal length, and a combination of shutter speed and aperture value suitable for the result of TTL metering may be read out from the stored information.

Furthermore, although the angular-velocity sensor 1101 has been described as an example of a part of the shake detection section according to the invention, the invention is not limited thereto and any sensor may be employed as long as it is capable of detecting a camera shake.

Figure 8:
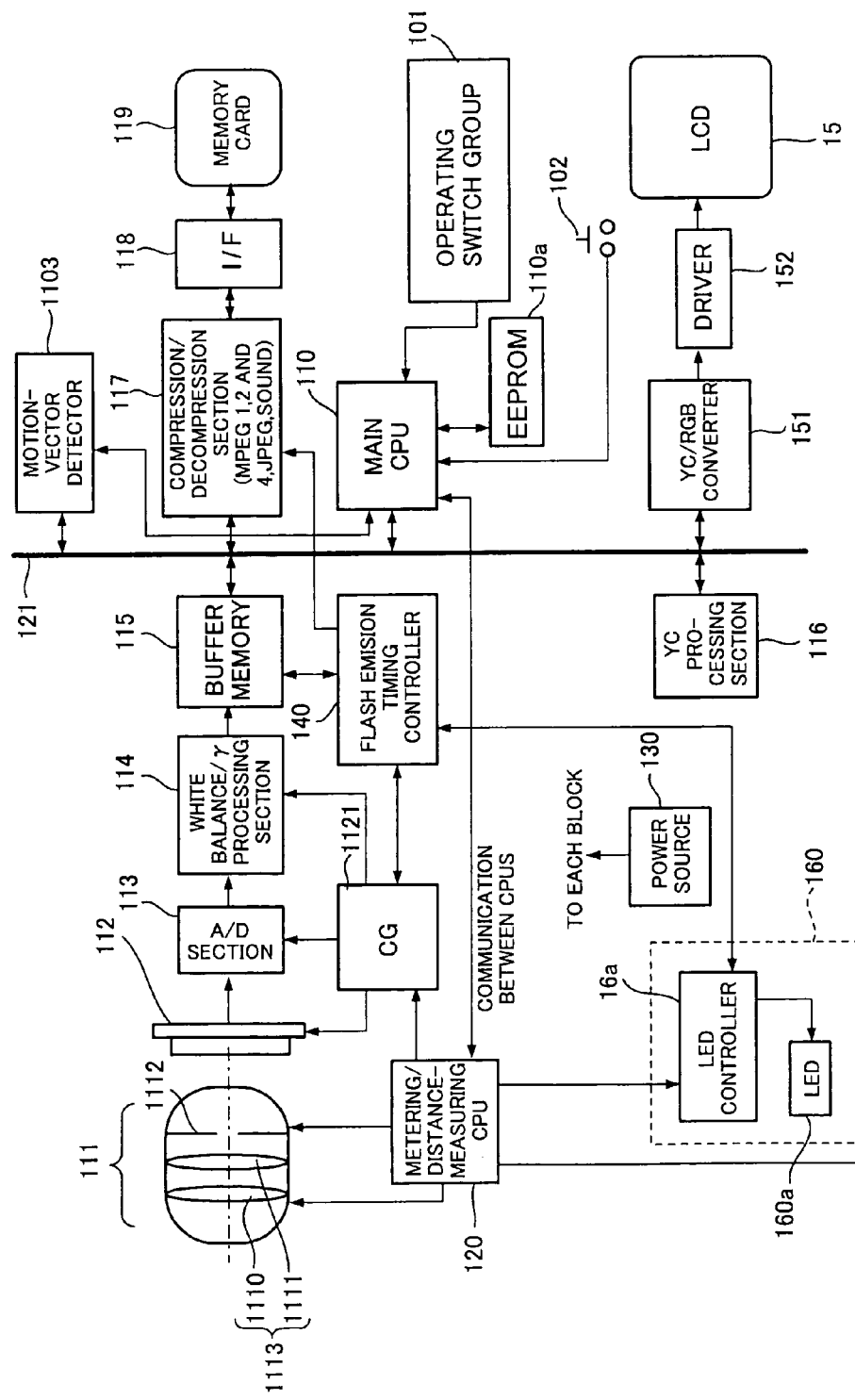
FIG. 8 is a block diagram illustrating the internal configuration of a digital camera according to a second embodiment.
Figure 9:
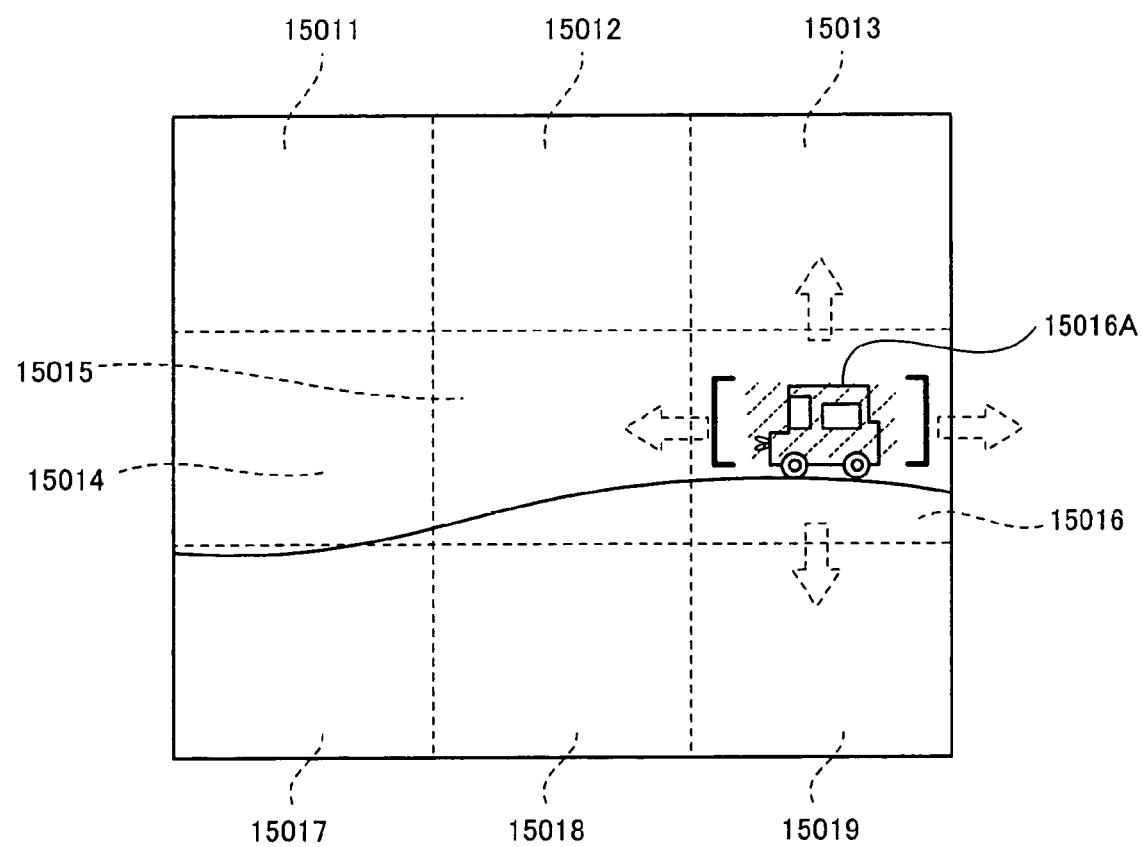
FIG. 9 is a diagram showing distance-measurement areas into which a shooting angle of view is two-dimensionally divided.
Figure 10:
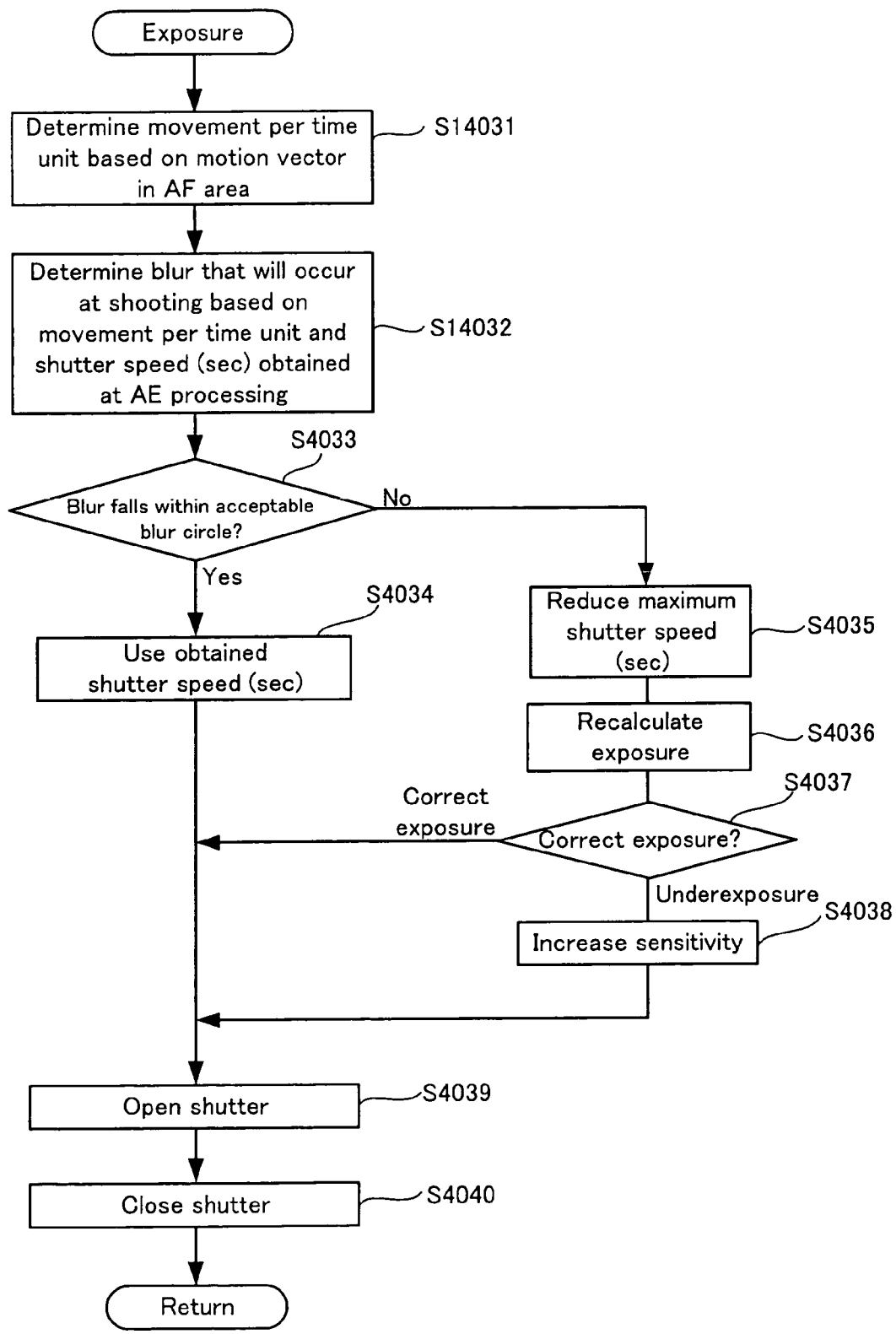
FIG. 10 is a flowchart showing the details of exposure processing performed by a main CPU of the digital camera according to the second embodiment.

FIGS. 8, 9 and 10 are diagrams showing a second embodiment of the invention.

FIG. 8 is a block diagram illustrating the internal configuration of a digital camera according to the second embodiment.

The digital camera of the second embodiment is the same as the digital camera 100 of the first embodiment shown in FIG. 3 except that a motion-vector detector 1103 is provided in place of the angular-velocity sensor 1101. The motion-vector detector 1103 detects a movement of a subject image formed on a CCD 112 by reading out image signals from a buffer memory 115 and comparing the read-out image signals with previously read-out image signals and outputs the result of the detection as a motion vector. What the motion-vector detector 1103 detects here is a subject-image movement in an area designated by a main CPU 110. The main CPU 110 designates a distance-measurement area, i.e. AF area, selected as an area to be focused from among plural distance-measurement areas and informs the motion-vector detector 1103 of the designated AF area. The motion-vector detector 1103 detects a movement of a subject image in the AF area to predict the level of a blur in a subject image that will occur at the time of shooting.

FIG. 9 shows distance-measurement areas 15011, 15012, 15013, 15014, 15015, 15016, 15017, 15018 and 15019 set up in a shooting angle of view. The shooting angle of view is two-dimensionally divided into nine areas (3×3=9). In the example shown in FIG. 9, the area 15016 is selected as an AF area from among the areas 15011 through 15019 and a subject 15016A in the selected area 15016 is made to be in focus. In this case, the motion-vector detector 1103 detects a movement of an image of the subject 15016A in the area 15016.

Since other elements and the appearance of the digital camera according to the second embodiment are the same as those of the first embodiment shown in FIGS. 1, 2 and 3, the same reference characters as those of the first embodiment are used here and the description thereof will be omitted.

FIG. 10 is a flowchart showing the details of exposure processing performed by the main CPU 110 of the digital camera of the second embodiment. The main processing of the second embodiment is the same as that of the first embodiment shown in FIG. 6 and therefore, the description thereof will be omitted.

First, at step S14031, the main CPU 110 determines a subject-image movement per time unit based on a subject-image movement in a distance-measurement area (AF area) where the subject is made in focus at the AF processing. Specifically, the main CPU 110 informs the motion-vector detector 1103 of an AF area where a subject-image movement is to be detected by the motion-vector detector 1103 and determines a subject-image movement per time unit based on a motion vector provided from the motion-vector detector 1103. At this step, a blur in a subject image is determined directly by a subject-image movement in the selected area.

Subsequently at step S14032, based on the subject-image movement per time unit and a shutter speed obtained at step S401 in FIG. 6, a blur in a subject image, which will occur at shooting performed at the shutter speed, is determined.

Processing at step S4033 and thereafter is the same as that shown in FIG. 7 and therefore, the description thereof will be omitted.

In this way, the digital camera of the second embodiment can reduce blurriness of a subject image without using a detector such as an angular-velocity sensor for example. Also, it is possible reduce not only blurriness of a subject image caused by camera shake but also that caused by movement of a subject.

The second embodiment of the invention corresponds to an example of the second image-taking apparatus according to the invention.

When the processing at steps S14031 and S14032 shown in FIG. 10 is performed by the main CPU 110 shown in FIG. 8, the combination of the processing at these steps and hardware such as the main CPU 110 and motion-vector detector 1103 corresponds to an example of the blur detection section of the second image-taking apparatus according to the invention.

Also, when the processing at steps S4033 through S4040 shown in FIG. 10 is performed by the main CPU 110 shown in FIG. 8, the combination of the processing at these steps and hardware such as the main CPU 110 and metering/distance-measuring CPU 120 corresponds to an example of the exposure control section of the second image-taking apparatus according to the invention.

Although the motion-vector detector 1103 has been described as an example of the blur detection section of the invention in the second embodiment, the invention is not limited thereto. The function of the motion-vector detector 1103 may be implemented as a part of processing performed by the main CPU 110 or may be implemented by a motion-vector detector used for compression between frames built in the compression/depression section 117.

Further, although an AF area is used as a selected area where a movement of a subject image is detected in the second embodiment, the invention is not limited thereto. An area where a movement of a subject image is detected may be an area where metering is performed, or may be selected directly through a user operation.

Figure 11:
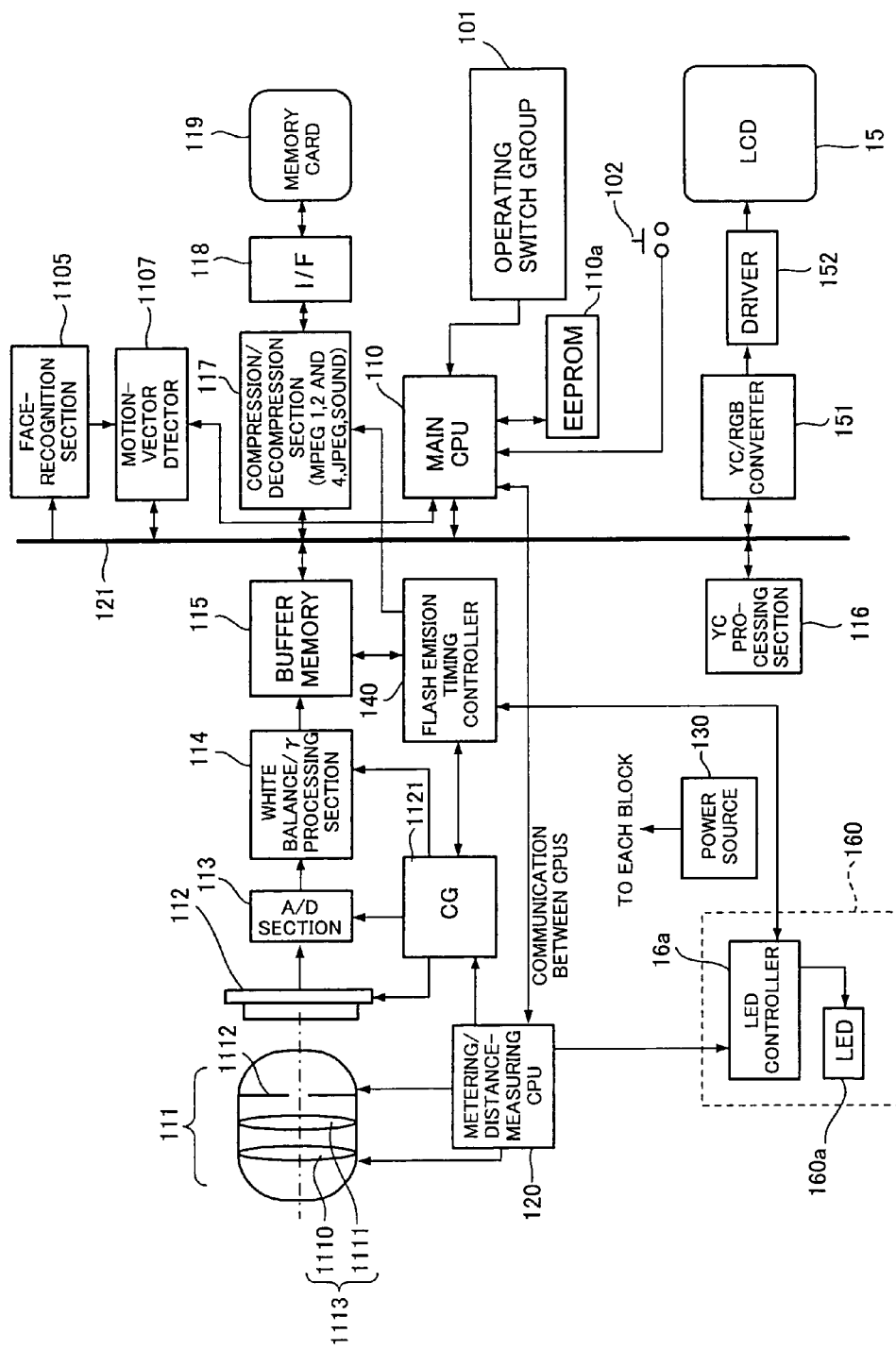
FIG. 11 is a block diagram illustrating the internal configuration of a digital camera according to a third embodiment.
Figure 12:
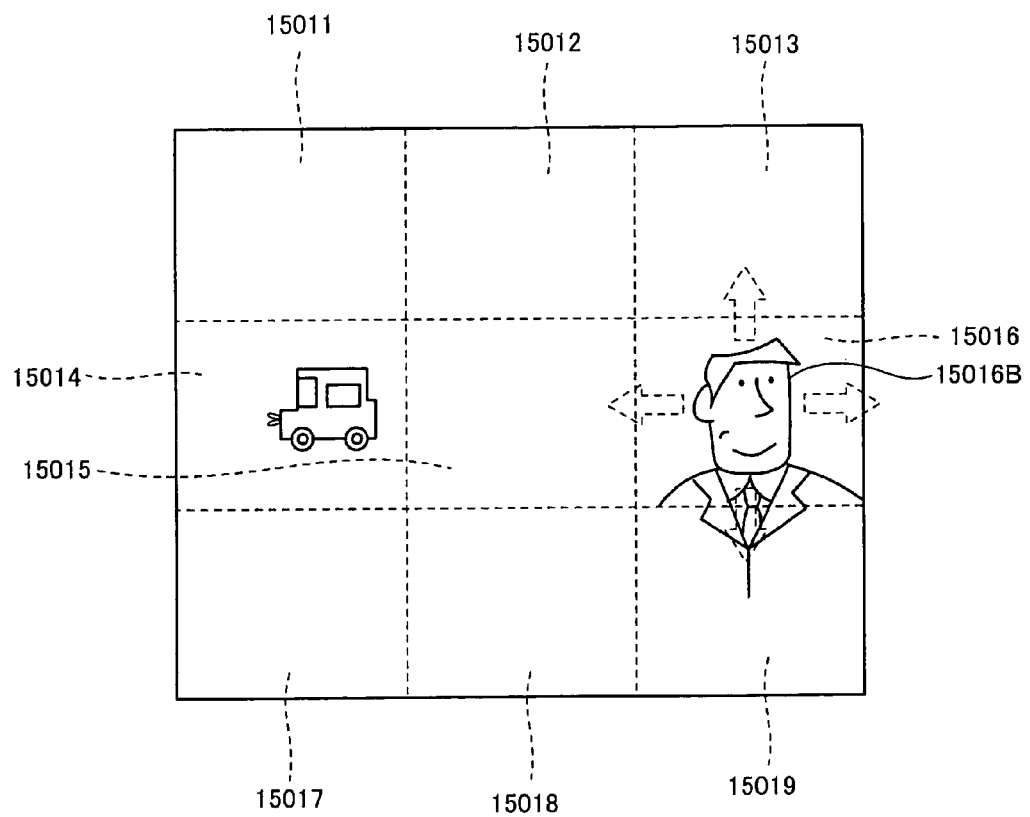
FIG. 12 is a diagram showing distance-measurement areas into which a shooting angle of view is two-dimensionally divided.
Figure 13:
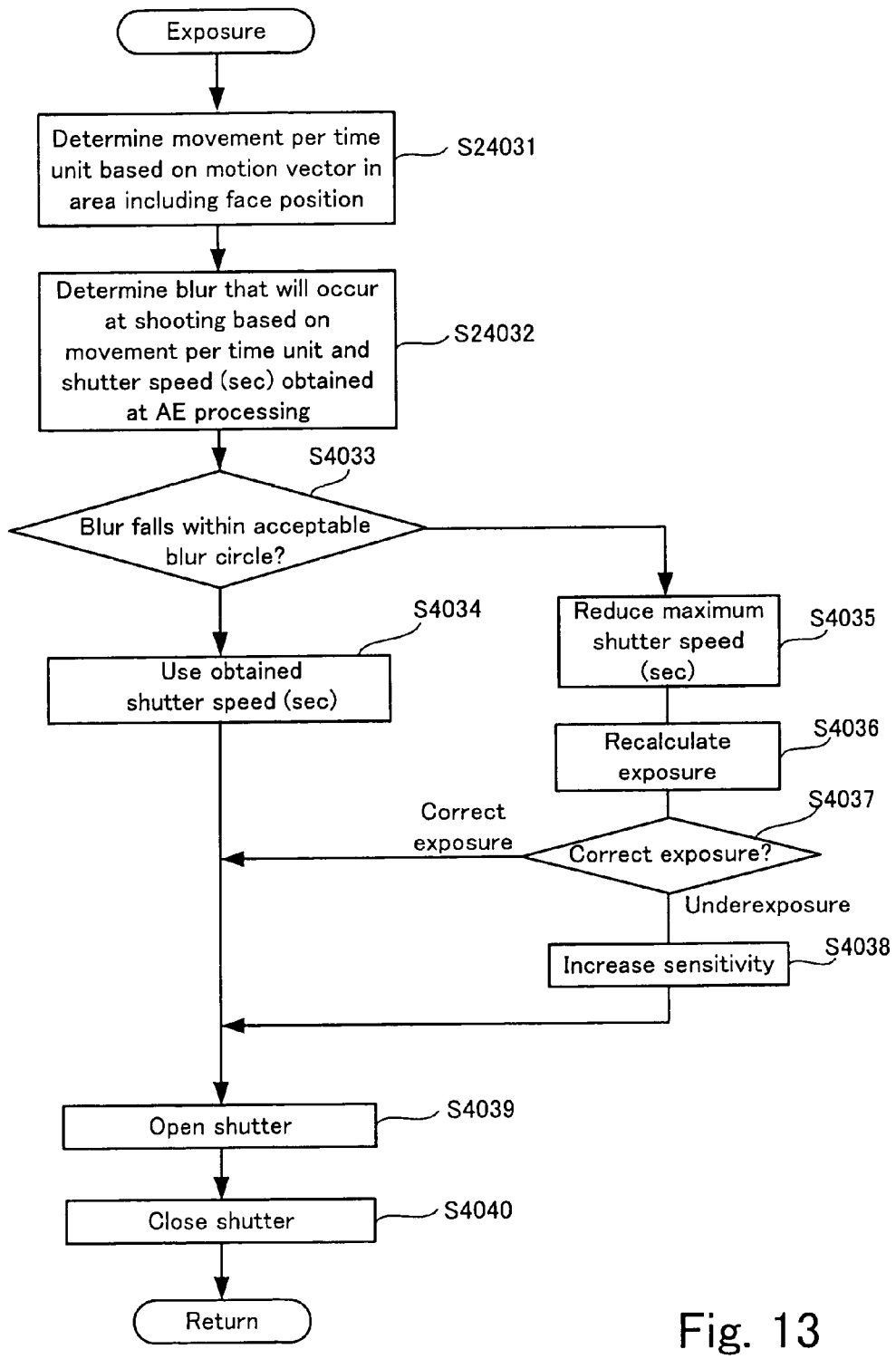
FIG. 13 is a flowchart showing the details of exposure processing performed by a main CPU of the digital camera according to the third embodiment.

FIGS. 11, 12 and 13 are diagrams showing a third embodiment according to the invention.

FIG. 11 is a block diagram illustrating the internal configuration of a digital camera according to the third embodiment.

The digital camera of the third embodiment is the same as the digital camera 100 of the first embodiment shown in FIG. 3 except that a face-recognition section 1105 and a motion vector detector 1107 for detecting a subject-image movement in an area including a face position detected by the face-recognition section 1105 are provided in place of the angular-velocity sensor 1101.

Since other elements and the appearance of the digital camera according to the third embodiment are the same as those of the first embodiment shown in FIGS. 1, 2 and 3, the same reference characters as those of the first embodiment are used here and the description thereof will be omitted.

FIG. 12 shows distance-measurement areas 15011, 15012, 15013, 15014, 15015, 15016, 15017, 15018 and 15019 set up in a shooting angle of view. The shooting angle of view is two-dimensionally divided into nine areas (3×3=9). In the example shown in FIG. 12, a face position of a subject 15016B is detected in the area 15016 among the areas 15011 through 15019. In this case, the motion vector detector 1107 detects a movement of an image of the subject 15016B in the area 15016.

FIG. 13 is a flowchart showing the details of exposure processing performed by a main CPU 110 of the digital camera of the third embodiment. The main processing of the third embodiment is the same as that of the first embodiment shown in FIG. 6 and therefore, the description thereof will be omitted.

First, at step S24031, the main CPU 110 determines a subject-image movement per time unit based on a motion vector in an area including a face position. Specifically, the main CPU 110 provides the motion vector detector 1107 with information about an area including a face position detected by the face-recognition section 1105 and the motion vector detector 1107 detects a subject-image movement in the area included in the received information. Therefore, at step S24031, a subject-image movement, i.e. a blur, at the recognized face position is detected.

Subsequently at step S24032, based on the subject-image movement per time unit and a shutter speed obtained at step S401 in FIG. 6, the main CPU 110 determines a blur of a subject image that will occur when shooting is performed at the obtained shutter speed.

The processing at step S4033 thereafter in FIG. 13 is the same as that shown in FIG. 7 and therefore, the description thereof will be omitted.

Usually, a face position detected by the face-recognition section 1105 receives more attention. For this reason, the elimination of blur is desired most in an area including the face position. The digital camera of the third embodiment is configured to detect a blur of a subject image in an area including a face position so that a condition for exposure suitable for the detected blur in this area can be selected. Also, it is possible to select a condition for exposure based on a blur in a face position without being affected by areas where a high contrast or a fast movement occurs even if such areas are present.

The third embodiment corresponds to an example of the second image-taking apparatus according to the invention.

When the CPU 110 shown in FIG. 11 performs the processing at steps S24031 and S24032, the combination of the processing at these steps and hardware such as the main CPU 110 and the motion-vector detector 1107 corresponds to an example of the blur detection section of the second image-taking apparatus according to the invention.

However, the invention is not limited to the above example that detects a face position. Any technique may be employed as long as it is capable of detecting an area where the elimination of a blur in a subject image is desired.

Further, although the face-recognition section 1105 has been described as an element independent of the main CPU 110, the invention is not limited thereto. The function of the face-recognition section may be implemented as a part of the processing performed by the main CPU 110.

What is claimed is:

1. An image-taking apparatus that includes an imaging device and a shooting lens of variable focal length and generates image signals by forming a subject image entering through the shooting lens on the imaging device, the image-taking apparatus comprising:
   a shake detection section that predicts a shake that will occur at shooting by detecting a shake before shooting; and
   an exposure control section that controls exposure by adopting a shutter speed within a maximum shutter speed that is changeable according to a result of shake detection by the shake detection section and a focal length of the shooting lens to be used at shooting,
   wherein the exposure control section increases sensitivity for shooting when underexposure is likely, even if a maximum shutter speed according to a result of shake detection by the shake detection section and a focal length of the shooting lens to be used at shooting is combined with any settable aperture value.

2. The image-taking apparatus according to claim 1, wherein the exposure control section determines whether the detected shake exceeds a threshold value and, if the detected shake exceeds a threshold level, the exposure control section adjusts a current shutter speed to a new shutter speed by selecting a shorter shutter speed by reducing the maximum shutter speed, and the exposure control section performs a calculation for exposure based on the new maximum shutter speed after the new maximum shutter speed is set by reduction , the exposure control section determines whether the underexposure will occur at the time of shooting based on the calculated exposure, and the sensitivity is increased if underexposure will occur.

3. The image-taking apparatus according to claim 2, wherein if the exposure control section determines whether the underexposure will occur, the exposure control section increases the sensitivity by selecting a higher ISO setting of the image-taking apparatus selected from a plurality of ISO settings.

4. The image-taking apparatus according to claim 1, wherein the shutter speed and the sensitivity are adjusted separately and independently from each other.

5. The image-taking apparatus according to claim 1, wherein the exposure control section performs a calculation for exposure based on a new shutter speed after the new shutter speed is set, the exposure control section determines whether the underexposure will occur at the time of shooting based on the calculated exposure, and the sensitivity is increased if underexposure will occur.

6. The image-taking apparatus according to claim 5, wherein the sensitivity is increased only when the underexposure is expected to occur at the time of shooting, after the shutter speed is adjusted.

7. The image-taking apparatus according to claim 1, wherein when underexposure is likely, the exposure control section increases the sensitivity by selecting a higher ISO setting of the image-taking apparatus selected from a plurality of ISO settings.

8. An image-taking apparatus that includes an imaging device and generates image signals by forming a subject image on the imaging device, comprising:
   a blur detection section that predicts a blur in a subject image that will occur at shooting by detecting a movement of a subject image before shooting; and
   an exposure control section that controls exposure by adopting a shutter speed within a maximum shutter speed that is changeable according to a result of movement detection by the blur detection section;
   wherein the exposure control section determines a subject-image movement per unit time based on a detected motion vector of the subject image, and determines a blur value that will occur at the time of shooting based on the subject-image movement per unit time and a current shutter speed;
   wherein when the blur value exceeds a threshold level, the exposure control section adjusts the current shutter speed to a new shutter speed by selecting a shorter shutter speed by reducing the maximum shutter speed; and
   wherein the exposure control section performs a calculation for exposure based on the new shutter speed after the new shutter speed is set, the exposure control section determines whether an underexposure will occur at the time of shooting based on the calculated exposure, and the exposure control section increases sensitivity for shooting when the underexposure is likely.

9. The image-taking apparatus according to claim 8, wherein the blur detection section detects a movement of a subject image in an area selected from a plurality of areas within a shooting angle of view.

10. The image-taking apparatus according to claim 9, further comprising a face recognition section that recognizes a face position of a person within the shooting angle of view,
wherein the blur detection section detects a movement of a subject image in the face position recognized by the face recognition section.

11. The image-taking apparatus according to claim 10, wherein the blur detection section calculates a blur value from detecting a movement of a face of the subject image.

12. The image-taking apparatus according to claim 8, wherein the shutter speed and the sensitivity are adjusted separately and independently from each other.

13. The image-taking apparatus according to claim 12, wherein the exposure control section increases the sensitivity by selecting a higher ISO setting of the image-taking apparatus selected from a plurality of ISO settings.

14. The image-taking apparatus according to claim 12, wherein the sensitivity is increased only when the underexposure is expected to occur at the time of shooting, after the shutter speed is adjusted.

* * * * *